United States Patent
Wang et al.

(10) Patent No.: US 10,659,657 B2
(45) Date of Patent: May 19, 2020

(54) TEXTURE PRINTING SYSTEM

(71) Applicant: KYOCERA Document Solutions, Inc., Osaka (JP)

(72) Inventors: Hui Wang, Temple City, CA (US); Tomohiro Kuwahara, Torrance, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 16/129,689

(22) Filed: Sep. 12, 2018

(65) Prior Publication Data

US 2020/0084340 A1    Mar. 12, 2020

(51) Int. Cl.
| | |
|---|---|
| *H04N 1/54* | (2006.01) |
| *G03G 15/22* | (2006.01) |
| *H04N 1/52* | (2006.01) |
| *H04N 1/40* | (2006.01) |
| *H04N 1/60* | (2006.01) |
| *B41J 11/00* | (2006.01) |

(52) U.S. Cl.
CPC .......... *H04N 1/54* (2013.01); *B41J 11/002* (2013.01); *G03G 15/224* (2013.01); *H04N 1/40081* (2013.01); *H04N 1/52* (2013.01); *H04N 1/6008* (2013.01)

(58) Field of Classification Search
CPC ....................................................... H04N 1/54
USPC ....................................................... 358/1.15
See application file for complete search history.

(56) References Cited

U.S. PATENT DOCUMENTS

| | | | |
|---|---|---|---|
| 6,483,942 B1* | 11/2002 | Curry | H04N 1/40 358/1.9 |
| 7,869,083 B1 | 1/2011 | Vanderhye | |
| 8,605,333 B2 | 12/2013 | Kuo et al. | |
| 2009/0022402 A1* | 1/2009 | Lee | G06T 3/4007 382/195 |
| 2010/0134811 A1 | 6/2010 | Fukasawa et al. | |
| 2012/0300229 A1* | 11/2012 | Kuo | G06K 1/121 358/1.9 |
| 2013/0002739 A1* | 1/2013 | Kuo | G06K 15/129 346/78 |
| 2013/0003087 A1* | 1/2013 | Kuo | G06K 15/1802 358/1.9 |
| 2016/0136982 A1 | 5/2016 | Heath | |

* cited by examiner

*Primary Examiner* — Jacky X Zheng
(74) *Attorney, Agent, or Firm* — Fitch, Even, Tabin & Flannery LLP

(57) ABSTRACT

Systems, apparatuses, and methods are provided herein for texture printing. A system comprises a rasterizer configured to convert an input image with texture information to color data and texture attribute plane data, the rasterizer is configured to set the change bit of pixel n to zero when the texture information associated with pixel n is the same as pixel n-1. The system further comprises a data compressor, a memory device, a data decompressor, a color converter and a halftoner configured to convert the color data to color halftone data, and a texture data generator configured to combine the texture attribute plane data decompressed by the data decompressor and the color halftone data from the halftoner to generate output ink data for a printer engine to print the input image with texture.

20 Claims, 4 Drawing Sheets

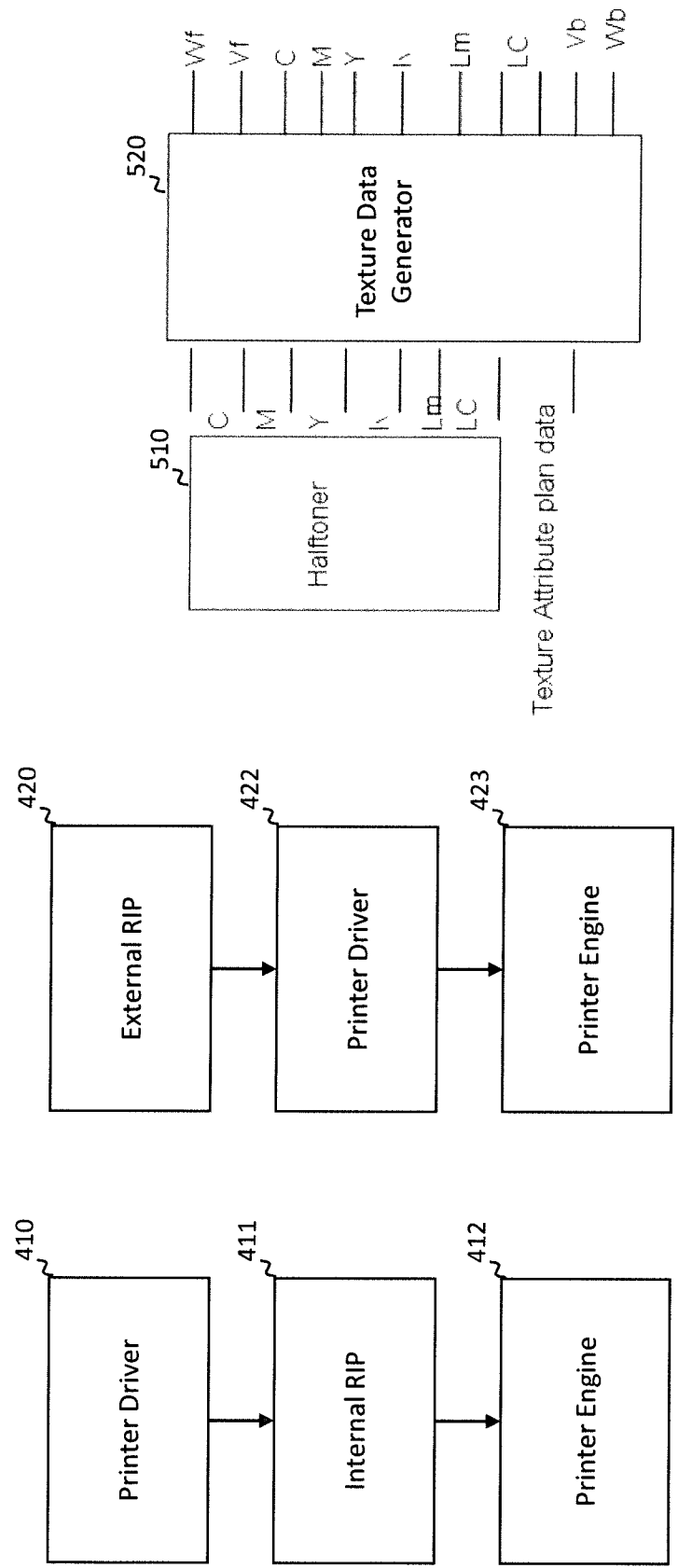

FIG. 6

| LNUM | | | VAR | | WBG | WFG | CHG |
|---|---|---|---|---|---|---|---|
| bit7 | bit6 | bit5 | bit4 | bit3 | bit2 | bit1 | bit0 |

FIG. 7

| data Name | Wf | Vf | C | M | Y | K | Lm | Lc | Vb | Wb |
|---|---|---|---|---|---|---|---|---|---|---|
| data meaning | Foreground White Layer number | Foreground Varnish Layer number | Cyan Density | Magenta Density | Yellow Density | Black Density | Light Magenta Density | Light cyan Density | Background Varnish layer number | Background White layer number |
| 4BPP ouput case (value) | 0~15 | 0~15 | 0~15 | 0~15 | 0~15 | 0~15 | 0~15 | 0~15 | 0~15 | 0~15 |

TEXTURE PRINTING SYSTEM

TECHNICAL FIELD

This invention relates generally to printers, and more specifically to inkjet texture printers.

BACKGROUND

Inkjet printing is a type of computer printing that recreates a digital image by propelling droplets of ink onto substrates. Inkjet printers can also be utilized to create texture by adding layers of ink to a surface to create haptic and visual perceptions of roughness on the printed surface. In contrast to 3D printing, which can create fully three-dimensional objects, texture printing is sometimes referred to as 2.5D printing.

Colorless and transparent varnish ink is typically used to build texture in texture printing. Varnish ink deposited in areas of a printed surface can add shine and depth to specific elements (e.g. logo, image) on the page. In some instances, varnish ink can be glossy, satin, or matte.

A texture inkjet printer typically uses Ultraviolet (UV) light to dry or cure varnish ink. To create texture, the printer deposits ink on the surface of the substrate and a UV light follows close behind to cure or dry the ink. Due to the speed of UV curing, dots of wet ink are hardened to create texture detail before they spread out. This curing process is generally more environmentally friendly as it produces fewer volatile organic compounds, less odor, and less heat. UV curing also allows nontraditional materials like acrylic or aluminum to be printed and may build up to two inches of texture ink thickness.

While varnish ink is often used alongside convention color ink in a texture inkjet printer, components of a conventional inkjet printer have hardware limitations that make implementing texture printing capability with conventional inkjet printer components a technical challenge.

SUMMARY

Generally speaking, pursuant to various embodiments, systems, apparatuses and methods are provided herein for texture printing. In some embodiments, a system for texture printing comprises a rasterizer configured to convert an input image with texture information to color data and texture attribute plane data, wherein a first bit for defining each pixel in the texture attribute plane data comprises a change bit and the rasterizer is further configured to set the change bit of pixel n to zero when the texture information associated with pixel n is the same as pixel n−1, a data compressor configured to compress the color data and the texture attribute plane data into compressed image data, a memory device configured to store the compressed image data prior to printing, a data decompressor configured to decompress the compressed image data to retrieve the color data and the texture attribute plane data, a color converter and a halftoner configured to convert the color data to color halftone data, and a texture data generator configured to combine the texture attribute plane data decompressed by the data decompressor and the color halftone data from the halftoner to generate output ink data for a printer engine to print the input image with texture.

In some embodiments of the system above, bits defining each pixel in the texture attribute plane data comprise the change bit, at least one texture layer selection bit for indicating a texture layer type, and texture layer number bits for indicating a thickness of the texture layer type. In some embodiments of the system above, the at least one texture layer selection bit indicates an ink type and a layer position. In some embodiments of the system above, bits defining each pixel in the texture attribute plane data comprise the change bit, a white foreground bit, a white background bit, a varnish bit, and a plurality of texture layer number bits. In some embodiments of the system above, each pixel is defined by 8 bits in the texture attribute plane data. In some embodiments of the system above, when the texture information of the input image specifies thicknesses of a plurality of texture layer types, the rasterizer is configured to generate at least one additional texture attribute plane for an additional texture layer type. In some embodiments of the system above, the data compressor is configured to assume all bits defining a pixel in the texture attribute plane data are zero when the first bit of the pixel is zero. In some embodiments of the system above, the rasterizer is further configured to set all bits defining pixel n in the texture attribute plane data to zero when the texture information associated with pixel n is the same as pixel n−1. In some embodiments of the system above, the rasterizer is implemented on a printer device that receives the input image from a host device having a printer driver. In some embodiments of the system above, the rasterizer is implemented on a host device having a printer driver configured to drive the printer engine on a printer device using the output ink data. In some embodiments of the system above, texture information of the input image comprises a texture image and wherein the value of each pixel indicates texture height or texture ink layer number. In some embodiments of the system above, the texture information of the input image comprises spot color texture information and wherein each value of a spot color index is set to indicate a varnish layer thickness, a presence of a background white ink, or a presence of a foreground white ink. In some embodiments of the system above, the texture information of the input image comprises texture printing job command in printer job language (PJL) defined by a printer driver. In some embodiments of the system above, the color converter comprises a plurality of hardware converter s configured to process different color channels in the color data in parallel. In some embodiments of the system above, the output ink data comprises a plurality of color channels and at least one texture channel selected from a foreground white layer number channel, a background white layer number channel, and a varnish layer number channel. In some embodiments of the system above, the value of the at least one texture channel indicates the thickness of a corresponding texture layer.

In some embodiments, a method for supporting texture printing comprises converting, with a rasterizer, an input image with texture information to color data and texture attribute plane data, wherein a first bit for defining each pixel in the texture attribute plane data comprises a change bit and the rasterizer is further configured to set the change bit of pixel n to zero when the texture information associated with pixel n is the same as pixel n−1, compressing, with a data compressor, the color data and the texture attribute plane data into compressed image data, storing, on a memory device, the compressed image data prior to printing, decompressing, with a data decompressor, the compressed image data to retrieve the color data and the texture attribute plane data, converting, with a color converter and a halftoner, the color data to color halftone data, and combining, with a texture data generator, the texture attribute plane data decompressed by the data decompressor and the color halftone data from the halftoner to generate output ink data for a printer engine to print the input image with texture.

In some embodiments of the method above, bits defining each pixel in the texture attribute plane data comprise the change bit, a white foreground bit, a white background bit, a varnish bit, and a plurality of texture layer number bits.

In some embodiments, a method for supporting texture printing comprises receiving an input image with texture information, generating texture attribute plane data based on the texture information of the input image, wherein bits defining each pixel in the texture attribute plane data comprise a first bit corresponding to a change bit, at least one bit specifying a texture type, and at least one bit specifying a texture thickness, comparing texture information associated with each pixel n with a previous pixel n−1, and setting the change bit of pixel n to zero when the texture information associated with pixel n is the same as pixel n−1 and setting the change bit of pixel n to one when the texture information associated with pixel n is different from pixel n−1 to generate texture attribute plane data for the input image, generating color data for the input image, and storing the texture attribute plane data and the color data for printing.

In some embodiments of the method above, the bits defining each pixel in the texture attribute plane data comprise the change bit, a white foreground bit, a white background bit, a varnish bit, and a plurality of texture layer number bits.

BRIEF DESCRIPTION OF THE DRAWINGS

Disclosed herein are embodiments of apparatuses and methods for texture printing. This description includes drawings, wherein:

FIGS. 4A and 4B comprise block diagrams internal and external raster image processors in accordance with several embodiments;

FIG. 5 comprises a block diagram in accordance with several embodiments;

FIG. 6 comprises an example of texture plane data bit definition in accordance with several embodiments; and FIG. 7 comprises an example of output printer ink data in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
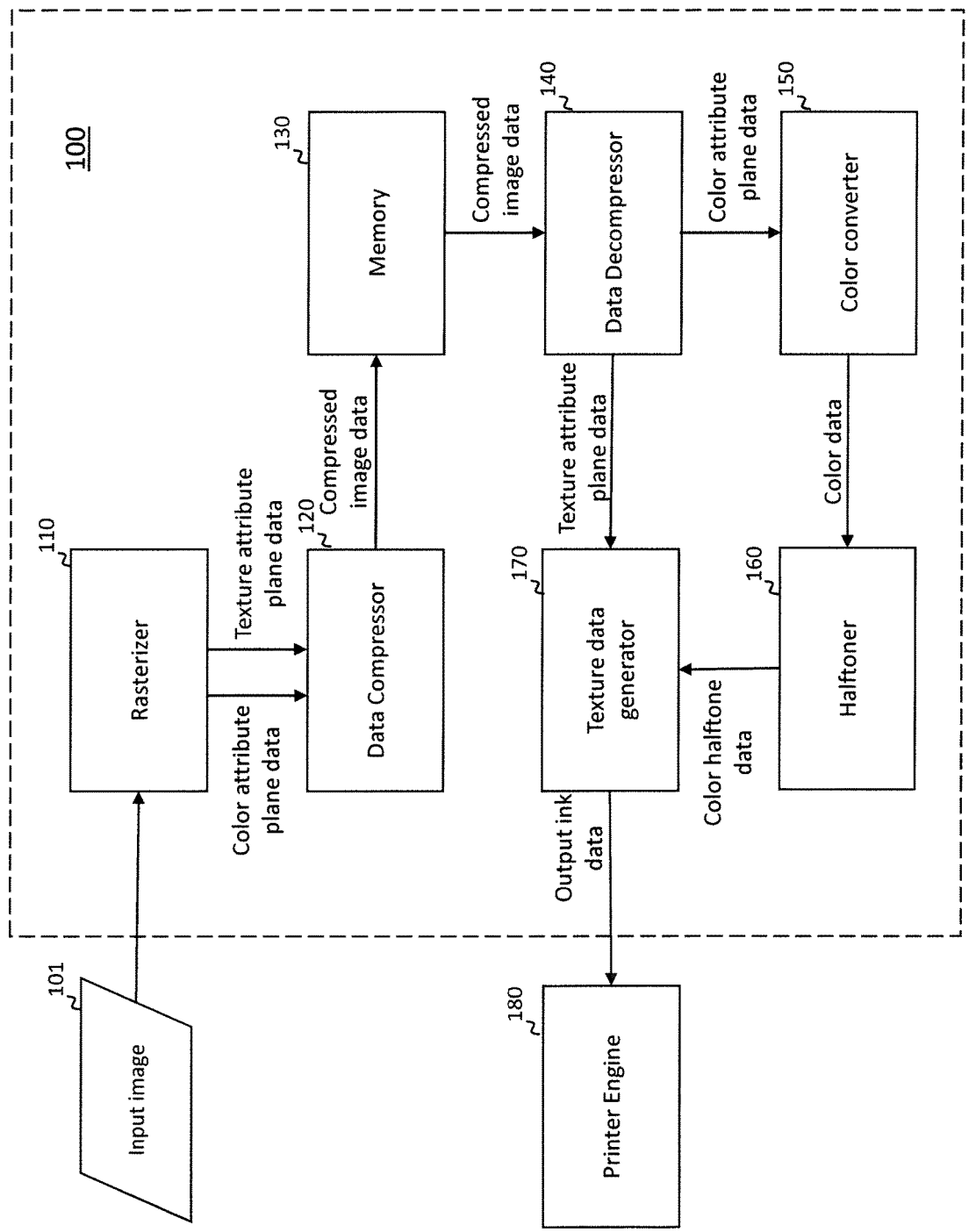
FIG. 1 comprises a block diagram in accordance with several embodiments.

Referring now to FIG. 1, a system for texture printing is shown. The system 100 is generally configured to process an input image 101 to generate output ink data that can be used by a printer engine 180 to print a textured image. The system 100 comprises a rasterizer 110, a data compressor 120, a memory 130, a data decompressor 140, a color converter 150, a halftoner 160, and a texture data generator 170.

The rasterizer 110 is configured to convert an input image with texture information to color data and texture attribute plane data. The rasterizer generally handles drawing interpretation and rasterization including texture attribute plane generation. The rasterizer 110 includes an interpreter configured to convert one or more types of color and texture data (e.g. printer description language (PDL)) to system-specific color data and texture attribute plane data. In some embodiments, the rasterizer further outputs color attribute plane data comprising pixel object types such as text or image, halftone types, and pipeline information. In some embodiments, a first bit for defining each pixel in the texture attribute plane data comprises a change bit and the rasterizer is configured to set the change bit of pixel n to zero when the texture information associated with pixel n is the same as pixel n−1. In some embodiments, bits defining each pixel in the texture attribute plane data comprise the change bit, at least one texture layer selection bit for indicating a texture layer type, and texture layer number bits for indicating a thickness of the texture layer type. The texture layer selection bit may indicate an ink type (e.g. varnish ink, white ink) and a layer position (e.g. foreground, background). The rasterizer may be configured to populate the texture attribute plane data of a pixel based on the texture information of the input image. In some embodiments, when the texture information of the input image specifies thicknesses of a plurality of texture layer types, the rasterizer is configured to generate one or more additional texture attribute planes for each additional texture layer type. Further details of the rasterizer 110 are provided with reference to FIGS. 2 and 3 herein. An example of a texture attribute plane data bit definition according to some embodiments is described with reference to FIG. 6 herein.

The data compressor 120 is configured to compress color data and texture attribute plane data to be stored in the memory 130. In some embodiments, the data compressor 120 is implemented on an ASIC with a bit width equal to the number bits per pixel (BPP) in the color data and the texture attribute plane data (e.g. 8 BPP). The data compressor 120 may use a lossless data compression algorithm based on statistical redundancy. In some embodiments, when compressing the texture attribute plane data, the data compressor 120 is configured to assume all bits of a pixel in the texture attribute plane data are zero when the first bit (CHG) of the pixel is zero. In some embodiments, the data compressor 120 may comprise a data compressor used in a conventional inkjet printer that is utilized to compress texture attribute plane data in addition to color data.

The memory 130 may comprise volatile and/or non-volatile computer readable memory storage. The memory 130 is generally configured to store compressed image data and allows the printer to print multiple copies of a page (e.g. page store) and/or queue up multiple pages for printing.

The data decompressor 140 is configured to decompress the compressed image data from the memory 130. In some embodiments, the data decompressor 140 is implemented on an ASIC with a bit width equal to the number bits per pixel in the color data and the texture attribute plane data (e.g. 8 BPP). In some embodiments, the data decompressor 140 uses a decompression algorithm complementary to the compression algorithm of the data compressor 120. In some embodiments, the data decompressor 140 may comprise a data decompressor used in a conventional inkjet printer that is utilized to decompress texture attribute plane data in addition to color data.

The color converter 150 is configured to convert printer engine-independent color data to engine-specific colors. For example, the color converter 150 may take CMYK color data as input and generate color data specific to the printer engine. In some embodiments, the color converter 150 performs color conversion based on color attribute plane data from the rasterizer 110. In some embodiments, the system 100 may comprise two or more color converters configured to convert color data in parallel. For example, if the printer supports more than four color channels, a first color converter may handle CMYK while a second color converter may be used for the additional color channels such as Lm and Lc. While a CMYK-based printer is generally described herein, in some embodiments, the systems and methods herein may similarly be implemented with a red, green, blue (RGB) system. In some embodiments, if the bandwidth of the ASIC on which the converter is implanted is not large enough for the number of color channels in the color data, one converter may be used to process the color channels serially in two or more passes. In some embodiments, the color converter 150 may comprise a data color converter used in a conventional inkjet printer.

The halftoner 160 is configured to convert the BPP of the converted color data (e.g. 8 BPP) to printer engine supported bit width (e.g. 4 BPP). In some embodiments, the halftoner 160 halftones the image based on color attribute plane data from the rasterizer 110. In some embodiments, the halftoner 160 may comprise a halftoner used in a conventional inkjet printer. The texture attribute plane data may generally bypass the color converter 150 and halftoner 160.

The texture data generator 170 is configured to combine the texture attribute plane data from the data decompressor 140 with the color halftone data from the halftoner 160 to generate output ink data for the printer engine 180. In some embodiments, the output ink data comprises a plurality of color channels and at least one texture channel selected from a foreground white layer number channel, a background white layer number channel, and a varnish layer number channel. In some embodiments, the texture data generator 170 may be configured to populate pixels in the texture data plane having a zero (0) first bit with the value of the last non-zero pixel. As such, ink data associated with a pixel may be generated based on the halftoned color ink data of the pixel and texture attribute plane value of the previous non-zero pixel. In some embodiments, the texture data generator 170 may further be configured to generate output ink data based on printer inks configuration (e.g. supported ink, ink print order) and/or PJL texture command from the printer driver. For example, if texture attribute plane is not present, the texture data generator 170 may use the print job's PJL texture printing command value to generate output ink data. Further details of the texture data generator and output ink data are described with reference to FIGS. 5 and 7 herein.

In some embodiments, one or more of the rasterizer 110, the data compressor 120, the memory 130, the data decompressor 140, the color converter 150, the halftoner 160, and the texture data generator 170 may be collectively referred to as a raster image processor (RIP) and/or a raster processor unit (RPU). In some embodiments, a RIP may be an internal RIP comprising a firmware program executed on a microprocessor and/or an ASIC inside a printer as described with reference to FIG. 4A. In some embodiments, one or more of the rasterizer 110, the data compressor 120, the data decompressor 140, the color converter 150, the halftoner 160, and the texture data generator 170 may be implemented with one or more ASIC devices in a printer. In some embodiments, the RIP may be an external RIP comprising a software component of an operating system on a host computer system as described with reference to FIG. 4B. In some embodiments, the data compressor 120 and data decompressor 140 may be omitted in an external RIP. In some embodiments, one or more of the rasterizer 110, the data compressor 120, the data decompressor 140, the color converter 150, the halftoner 160, and the texture data generator 170 may be implemented as one or more software and/or hardware modules on a host device and/or a printer.

Figures 2, 3:
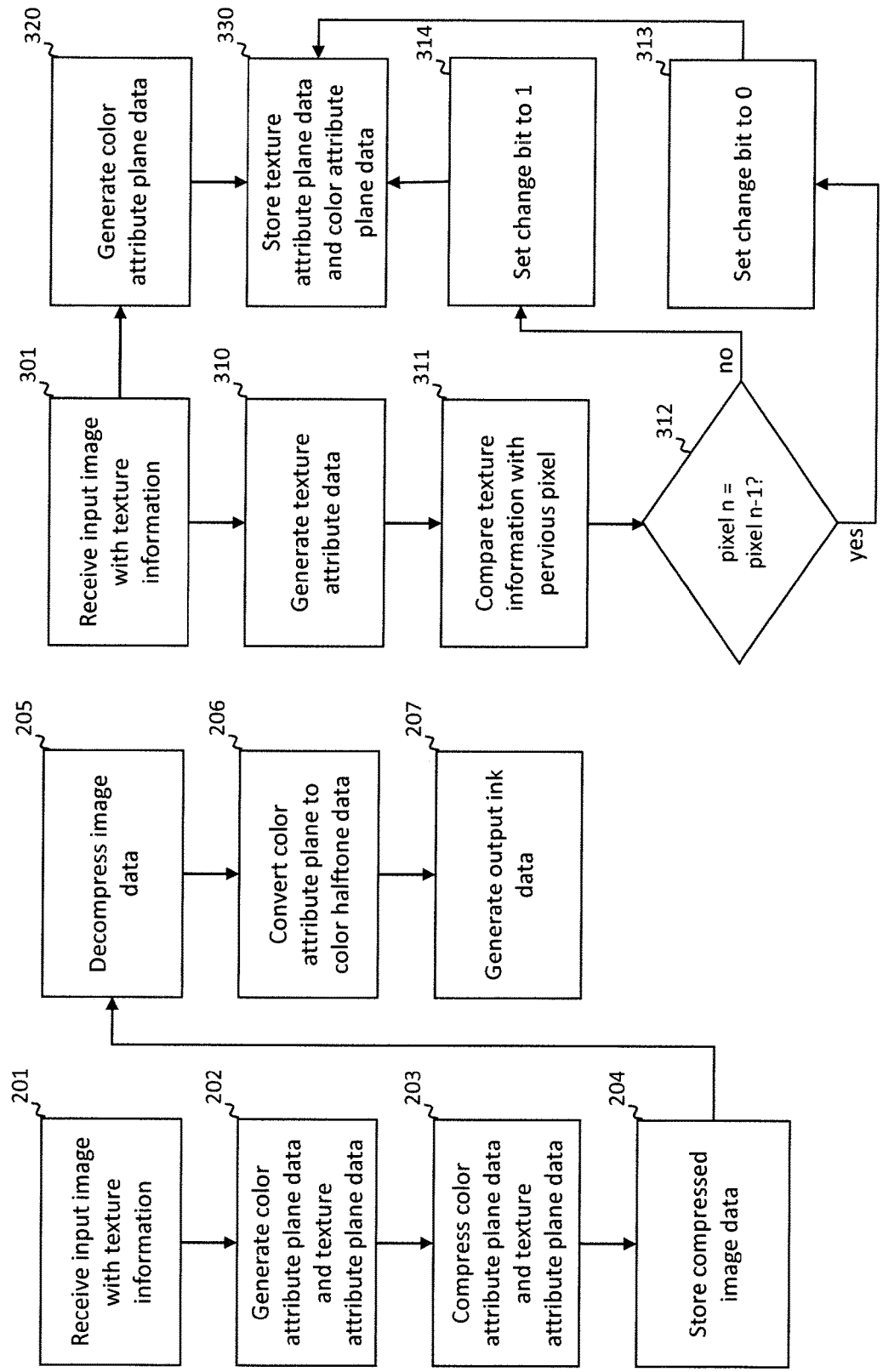
FIG. 2 comprises a flow diagram in accordance with several embodiments.
FIG. 3 comprises a flow diagram of a rasterizer in accordance with several embodiments.

Referring now to FIG. 2, a method for supporting texture printing is shown. The steps of FIG. 2 may generally be performed by a RIP/RPU. In some embodiments, one or more steps shown in FIG. 2 may be performed by a RIP implemented on a printer device that receives the input image from a host device having a printer driver. In some embodiments, one or more steps shown in FIG. 2 may be performed by a RIP implemented on a host device having a printer driver configured to drive the printer engine on a separate printer device. In some embodiments, one or more steps of FIG. 2 may be performed by one or more components of the system 100 described with reference to FIG. 1 or a similar system.

In step 201, the system receives an input image with texture information. In some embodiments, the input image may comprise color data, color attribute plane data, and texture attribute plane data. The input image may generally be provided by a printer driver on a host device such as a computer. In some embodiments, the input image may comprise printer driver generated Page Description Language (PDL) such as XPS, PCL5, PCL6, PDF, PostScript, among others. The system may be configured to process different types of texture information associated with the input image. In some embodiments, texture information may comprise a texture image in which the value of each pixel indicates the texture heights or texture ink layer number. In some embodiments, texture information may comprise spot color texture information in which each value of a spot color index is set to indicate a varnish layer thickness, a presence of a background white ink, or a presence of a foreground white ink. One example of setting spot color index to indicate texture value is provided as follows:

idx1=1 layer Varnish
idx2=2 layer Varnish
idx7=7 layer Varnish
idx16=background white
idx17=foreground white In some embodiments, texture information may comprise texture printing job command generated by the printer driver. Examples of texture printing job commands for defining white and varnish ink usages are provided as follows:
1) @PJL SET TEXTURE=WHITEALL—Apply N layer white ink right on printing material of all printing area.
2) @PJL SET TEXTURE=VARNISHALL—Apply N layer Varnish ink right on printing material of all printing area.
3) @PJL SET TEXTURE=WHITEUNDCOLOR—Apply N layer white ink underneath the colored ink area.
4) @PJL SET TEXTURE=VARNISHUNDCOLOR—Apply N layer Varnish ink underneath the colored ink area.
5) @PJL SET TEXTURE=WHITEONCOLOR—Apply N layer White ink on top of colored ink area
6) @PJL SET TEXTURE=VARNISHONCOLOR—Apply N layer varnish ink on top of colored ink area.
7) @PJL SET TEXTURELAYER=N (number)—set with other PJL texture printing commands In step 202, a rasterizer generates color data and texture attribute plane data based on the input image. The color data may be generated based on conventional color rasterization processes. In some embodiments, the rasterizer further may output color attribute plane data according to conventional processes. For the texture attribute plane, the system may convert texture image and/or spot color data to generate texture attribute plane. In some embodiments, if the texture information is defined by printing job command, the system may omit the texture attribute plane and pass the PJL command directly to a texture data generator for generating output ink data. In some embodiments, if PJL command is present and texture image or spot color texture data is also present, PJL command may be ignored by the system.

The texture attribute plane is generated to keep the texture information for use in the printing pipeline. In some embodiments, the rasterizer is configured to populate the texture attribute plane to improve the compression rates of the texture attribute data along the printer pipeline. In some embodiments, the first bit for defining each pixel in the texture attribute plane data comprises a change bit and the rasterizer is further configured to set the change bit of pixel n to zero when the texture information associated with pixel n is the same as pixel n−1. In some embodiments, bits defining each pixel in the texture attribute plane data comprise the change bit, at least one texture layer selection bit for indicating a texture layer type, and texture layer number bits for indicating the thickness of the texture layer type. In some embodiments, bits defining each pixel in the texture attribute plane data comprise the change bit (CHG), a white foreground bit (WFG), a white background bit (WBG), a varnish bit (VAR), and a plurality of texture layer number bits (LNUM) for indicating the thickness of the selected texture layer type.

In the texture attribute plane data, the value of the first pixel of a page generally comprises the actual texture information and the CHG bit is set to 1. As an example, for a rasterizer configured with the bit definition shown in FIG. 6, if the first pixel has 3 layers of varnish (VAR=1, LNUM=3), the texture attribute plane data for the pixel is set to 00111001. If the second pixel shares the same texture information as the first pixel, then the CHG bit of the second pixel in the texture attribute plane is set to 0. In some embodiments, the rasterizer is further configured to set all bits defining pixel n in the texture attribute plane data to zero (00000000) when the texture information associated with pixel n is the same as pixel n−1. If the texture value of the second pixel differs from the first pixel, the CHG bit is set to 1, and the remaining bits are populated with the pixel's texture information. For example, if the second pixel's texture information is changed to 5 layers of varnish, the texture attribute plane value of the pixel is set to 01011001.

In step 203, a data compressor compresses color data and texture attribute plane data to generate compressed image data for storage. In some embodiments, the data compressor is implemented on an ASIC with a bit width equal to the number of bits per pixel in the texture attribute plane data (e.g. 8 BPP). In some embodiments, the compressor may use a lossless data compression algorithm used in conventional inkjet printers to compress texture attribute plane data in addition to color data. In some embodiments, the data compressor is configured to assume all bits defining a pixel in the texture attribute plane data are zero when the first bit of the pixel (i.e. CHG) is zero. In step 204, the compressed image data is stored on a memory device.

In step 205, a data decompressor decompresses the stored image data to retrieve the color data and the texture attribute plane data. In some embodiments, the data decompressor is implemented on an ASIC with a bit width equal to the number bits per pixel in the color data and the texture attribute plane data (e.g. 8 BPP). In some embodiments, the data decompressor uses decompression algorithm complementary to the compression algorithm of the data compressor in step 203. In some embodiments, the decompressor may use a decompression algorithm used in conventional inkjet printers to decompress texture attribute plane data in addition to color data. In some embodiments, color attribute plane data is also compressed, stored, and decompressed in steps 203-205.

In step 206, the color data is converted to color halftone data with a color converter and a halftoner. In some embodiments, step 206 may be performed by color converters and halftoners used in conventional inkjet printers. In some embodiments, the color data may be converted and halftoned based on information in the color attribute plane. In some embodiments, the system may comprise a plurality of hardware converters configured to process different color channels in the color data in parallel. For example, a first color converter may process CMYK channels while a second converter processes Lc ad Lm color channels. In some embodiments, the texture attribute plane data bypasses the color converter and halftoner in step 206.

In step 207, a texture data generator combines the texture attribute plane data decompressed by the data decompressor and the color halftone data from the halftoner to generate output ink data for a printer engine to print the input image with texture. In some embodiments, the output ink data comprises a plurality of color channels and at least one texture channel selected from a foreground white layer number channel, a background white layer number channel, and a varnish layer number channel. In some embodiments, the texture data generator 170 is configured to populate pixels in the texture data plane having a zero (0) first bit with the value of the previously non-zero pixel. Further details of the texture data generator and output ink data are described with reference to FIGS. 5 and 7 herein.

Referring now to FIG. 3, a method for supporting texture printing is shown. The steps of FIG. 3 may generally be performed by a RIP and/or RPU. In some embodiments, one or more steps shown in FIG. 3 may be performed by a RIP implemented on a printer device that receives the input image from a host device having a printer driver. In some embodiments, one or more steps shown in FIG. 3 may be performed by a RIP implemented on a host device having a printer driver configured to drive the printer engine on a printer device using the output ink data. In some embodiments, one or more steps of FIG. 3 may be performed by the rasterizer 110 of system 100 described with reference to FIG. 1 or a similar component.

In step 301, the system receives an input image with texture information. The input image may generally be provided by a printer driver of a host device such as a computer. In some embodiments, the input image may comprise printer driver generated Page Description Language (PDL) such as XPS, PCL5, PCL6, PDF, PostScript, etc. The system may be configured to process different types of texture information such as texture image, spot color index value, and PJL.

In step 310, the system begins to generate texture attribute plane data based on the texture information of the input image. The bits defining each pixel in the texture attribute plane data comprise a first bit corresponding to a change bit, at least one bit specifying a texture type, and at least one bit specifying the texture thickness. Generally, the first bit of the first pixel of a page is one, and the remaining bits of the pixel define the pixel's texture.

In step 311, the system compares texture information associated with each subsequent pixel n with a previous pixel n−1. In step 312, if pixel n=pixel n−1, the process proceeds to step 313. In step 313, the change bit of the pixel is set to 0. In some embodiments, all bits of the pixel are set to 0 in step 313. If pixel n pixel n−1, the process proceeds to step 314. In step 314, the value of the pixel in the texture attribute plane is set to the texture value of the printed pixel based on the texture information of the input image.

In step 320, the system generates color data. In some embodiments, the system further generates color attribute plane data in step 320. In some embodiments, step 320 may comprise conventional color interpretation and rasterization.

In step 330, the texture attribute plane data and the color data are stored for printing. In some embodiments, the texture attribute plane data and the color data may be compressed, decompressed, and used to generate output ink data according to steps 203-207 described with reference to FIG. 2. In some embodiments, an external RIP implemented on a host device may omit data compression and decompression and directly use the texture attribute plane data and the color data generated according to the steps shown in FIG. 3 to generate output ink data.

Referring now to FIGS. 4A and 4B, illustrations of types of RIPs are shown. In FIG. 4A, a printer setup with an internal RIP is shown. In this setup, a printer driver 410 installed on a host device (e.g. computer, mobile device, etc.) is configured to receive the image and send the image to the printer. The image is received at the internal RIP 411 implemented on the printer device. The internal RIP 411 interprets and renders the image and generates ink data for printer engine 412 to produce the image.

Printers with internal RIP often uses an ASIC RIP that is quick in generating a large amount of printing data but has limited device configurability. The RIP of a conventional inkjet printer, for example, generally do not support color planes more than CMYK and has no mechanism to generate texture layer or white data. In some embodiments, the methods and systems described herein add the ability to generate white ink and varnish ink data to the internal RIP type ASIC pipelines with minimum changes to existing hardware. An internal RIP can further be modified to support color channels in addition to CMYK inks, such as Lm and Lc.

In FIG. 4B, a printer setup with an external RIP is shown. In this configuration, an external RIP 420 is implemented as a software program on a host device (e.g. computer). The printer driver 410 provides printer information such as printer supported ink, printer specified color conversion ink profile, and maximum texture layer number to the external RIP 420 to interpret and rasterize the images and generate texture attribute plane data. The printer driver 422 on the host device sends ink data directly to the printer engine 423 of a printer device without an internal RIP. This type of printer is widely used in wide format commercial inkjet printing. External RIPs have no specific device limitations and can provide users a wide range of data editing operations. However, since no specialized hardware is involved, data processing can be relatively slow.

In some embodiments, the systems and processes described herein may be implemented with printer devices with internal RIPs or host devices running external RIPs to drive the printer. When implemented on a printer device with RIP, some embodiments of systems and methods described herein allow RIPs of conventional printers to be adopted for texture printing with minimum modification. Some embodiments of the systems and methods described herein further reduce the processing and memory storage requirement of the host device running external RIP and a printer device having an internal RIP by configuring texture attribute plane data for improved data compression.

Referring now to FIG. 5, a halftoner 510 and a texture data generator 520 according to some embodiments are shown. In some embodiments, the halftoner 510 may comprise the halftoner 160 and the texture data generator 520 may comprise the texture data generator 170 described with reference to FIG. 1 herein.

The halftoner 510 receives color data and is configured to output printer-specific color data corresponding to the colors supported by the printer engine. In some embodiments, the halftoner 510 further takes color attribute plane data as input to output the printer-specific color data. In the embodiment shown in FIG. 5, the printer supports C, M, Y, K, Lm, and Lc color channels. In some embodiments, the halftoner 510 may comprise a conventional halftoner of an inkjet printer.

The texture data generator takes, as input, halftoned color data from the halftoner 510 (e.g. CMYKLmLc) and texture attribute plane data to generate output ink data. In the embodiment shown in FIG. 5, the output ink data comprises foreground white (Wf), foreground varnish (Vf), C, M, Y, K, Lm, Lc, background varnish (Vb), and background white (Wb). The values of Wf, Wb, Vf, and Vb represent the number of ink layers for each corresponding type of texture ink. In other embodiments, the number of color ink and texture ink channels and the order of the output data may vary according to printer configurations.

In some embodiments, the texture data generator may further be configured to generate output ink data including texture layer information based on PJL instead of texture attribute plan data. For example, if a print job's PJL texture printing command is @PJL SET TEXTURE=WHITEUNDCOLOR, the 4BPP halftoned color data for a pixel may be set to CMYKLmLc(1,2,1,1,1,1), and the final output ink data WfVfCMYKLmLcVW may be set to (0, 0,1,2,1,1,1,0,1). The value number for Wf Wb and Vf Vb represents layer number. In another example, if the print job's PJL texture printing command is @PJL SET TEXTURE=VARNISHONCOLOR and @PJL SET TEXTURELAYER=6, the color data for this pixel may be set to CMYKLmLc(1,2,4,7,3,1), and the final output ink data WfVfCMYKLmLcVbWb may be (0, 6, 1,2,4,7,3,1, 0, 0). In yet another example, if texture attribute plane data for a pixel is (00000000), and for previous non-zero pixel is (00111001), the color 4BPP data CMYKLmLc(1,2,1,1,1,1), the final output ink data may be WfVfCMYKLmLcVbWb is (0,0, 1,2,1,1,1,1,3,0).

Now referring to FIG. 6, bit definitions of a pixel in the attribute plane data according to some embodiments is shown. The pixel comprises 8 bits (bit 0-7). The first bit (bit 0) comprises a change (CHG) bit that indicates whether texture information is changed compared to the previous pixel value. The rasterizer is configured to set the CHG bit to 1 if the texture for a pixel is different with the previous pixel and set the CHG bit to 0 if the texture of a pixel is the same as the previous pixel. The CHG bit of the first pixel of a page is generally set to 1.

The second bit (bit 1) comprises a white foreground (WFG) bit that indicates whether white is to be printed between a varnish layer and a foreground color layer. The WFG bit is set to 1 if white is to be printed between the varnish layer and the foreground color layer and is set to 0 if no white is to be printed between the varnish layer and the foreground color layer.

The third bit (bit 2) comprises a white background (WBG) bit that indicates whether a white ink layer is to be printed on the printing surface. The WBG bit set to 1 if white is to be printed on the substrate surface and set to 0 if no white is to be printed on the substrate surface.

The fourth bit (bit 3) comprises a VAR bit that indicates whether varnish ink is to be printed. The VAR bit is set to 1 if varnish ink is to be printed and set to 0 if no varnish ink is to be printed.

The remaining bits (bit 4-7) comprise LNUM bits that indicate the number of texture ink layers to be deposited to build texture. With 4 bits, up to 16 layers of ink may be specified. If more layer definition is needed, a 1D lookup table can be used to indicate the final layer number to be sent to the printer engine. LNUM represents the layer number of varnish if VAR bit is one. If VAR bit is zero and the WBG bit is one, LNUM represents white background layer number. If VAR and WBG are both zero, WFG is one, LNUM represents white foreground layer number. If VAR, WBG, WFG are all zero, LNUM bits may be ignored by the texture data generator.

In some embodiments, in a texture printer, one ink (e.g. varnish) is used for building texture layer. Other inks are deposited in one layer: color inks are in one layer, white background is one layer, and white foreground is one layer. One texture attribute plane is sufficient in such cases. If more than two inks are deposited in multiple layers, two or more texture attribute planes may be used to indicate the thickness of each ink type. For example, for a pixel with 3-layers of varnish and 2 layers of background white, the pixel's value may be (00111001) in the first texture attribute plane and (00100101) in the second texture attribute plane.

The bit definitions in FIG. 7 are given as an example only, in alternate embodiments, one or more of the VAR, WBG, and WFB bits may be omitted, giving more bit width to LNUM. In some embodiments, other types of ink (e.g. matt varnish, glossy varnish, color varnished, etc.) may be additionally or alternatively defined in the texture attribute plane data. Generally, a pixel is defined in the texture attribute plane by one change bit, at least one ink type bit (e.g. VAR, WBG, WFG, etc.), and one or more layer number bits (LNUM).

Referring now to FIG. 7, an example of output ink data according to some embodiments is shown. The output ink data comprises foreground white layer number (Wf), foreground varnish layer number (Vf), cyan density (C), magenta density (M), yellow density (Y), black density (K), light magenta density (Lm), light cyan density (Lc), background varnish number (Vb), and background white layer number (Wb). In the embodiment shown in FIG. 7, the printer engine supports 4 BPP output and each color and texture channel is defined by 4 bits and can have a value ranging from 0-15. In some embodiments, the value of a color channel indicates color intensity and the value of a texture channel indicates the thickness of a corresponding texture layer. The texture data generator is configured to populate the layer thickness value of Wf, Vf, Vb, and Wn for each pixel based on the VAR, WBG, WFG and LNUM values of each pixel's texture attribute plane data. If a pixel texture attribute plane data has a 0 first bit (CHG), the texture data generator is configured to use the values from the previous non-zero pixel.

The output ink data in FIG. 7 is provided as an example only. Output ink data may be variously configured based on the printer engine's configuration. For example, for printer engines that do not support one or more color channels (e.g. Lm, Lc), these data may be omitted. The BPP of the data may also vary depending on the supported BPP of the printer engine (e.g. 4 BPP, 8 BPP, 12 BPP, etc.).

In some embodiments, the systems and methods described herein allow a texture printing system to be derived from a conventional inkjet printer and use many of the same components. In some embodiments, the texture printing system is configured to group texture information into a texture attribute plane and generate the texture attribute plane with consideration for higher data compression ratio. The specially designed texture attribute plane is generated to store texture effect information and achieve better compression ratio by including a CHG bit. The RIP interpreter may function as a regular CMYK printer interpreter for the color data. The rasterized CMY data from interpreter is later color converted to CMYK or more than CMYK color planes in an application specific integrated circuit (ASIC) color conversion module used in a conventional CMYK printer. The texture attribute plane data from RIP is compressed/decompressed in the printer ASIC pipeline and used by a texture data generator to create the final printing data. The application design keeps the RIP interpreter handling only color data and the texture attribute plane can utilize the existing compression and decompression modules in the ASIC pipeline to pass the data to the final texture data generator without extensive modification of the conventional printer pipeline. The methods described herein may similarly be used in an external RIP to generate output ink data to drive a printer engine.

Some of the functional units described in this specification have been labeled as modules, or components, to more particularly emphasize their implementation independence. For example, a module may be implemented as a hardware circuit comprising custom ASIC circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples, and applications thereof, numerous modifications and variations could be made thereto by those skilled in the art without departing from the scope of the invention set forth in the claims.

What is claimed is:

1. A system for texture printing comprising:
   a rasterizer configured to convert an input image with texture information to color data and texture attribute plane data, wherein a first bit for defining each pixel in the texture attribute plane data comprises a change bit, and the rasterizer is further configured to:
   compare texture information associated with a pixel (pixel n) with texture information associated with the previous pixel (pixel n−1) to determine whether the texture information of pixel n and pixel n−1 are the same, wherein the texture information associated with each pixel specifies a physical thickness of texture ink to be printed at the pixel; and
   set the change bit of pixel n to zero when the texture information associated with pixel n is the same as pixel n−1;
   a data compressor configured to compress the color data and the texture attribute plane data into compressed image data;
   a memory device configured to store the compressed image data prior to printing;
   a data decompressor configured to decompress the compressed image data to retrieve the color data and the texture attribute plane data;
   a color converter and a halftoner configured to convert the color data to color halftone data; and
   a texture data generator configured to combine the texture attribute plane data decompressed by the data decompressor and the color halftone data from the halftoner to generate output ink data for a printer engine to print the input image with texture.

2. The system of claim 1, wherein bits defining each pixel in the texture attribute plane data comprise the change bit, at least one texture layer selection bit for indicating a texture layer type, and texture layer number bits for indicating a thickness of the texture layer type.

3. The system of claim 2, wherein the at least one texture layer selection bit indicates an ink type and a layer position.

4. The system of claim 1, wherein bits defining each pixel in the texture attribute plane data comprise the change bit, a white foreground bit, a white background bit, a varnish bit, and a plurality of texture layer number bits.

5. The system of claim 1, wherein each pixel is defined by 8 bits in the texture attribute plane data.

6. The system of claim 1, wherein, when the texture information of the input image specifies thicknesses of a plurality of texture layer types, the rasterizer is configured to generate at least one additional texture attribute plane for an additional texture layer type.

7. The system of claim 1, wherein the data compressor is configured to assume all bits defining a pixel in the texture attribute plane data are zero when the first bit of the pixel is zero.

8. The system of claim 1, wherein the rasterizer is further configured to set all bits defining pixel n in the texture attribute plane data to zero when the texture information associated with pixel n is the same as pixel n−1.

9. The system of claim 1, wherein the rasterizer is implemented on a printer device that receives the input image from a host device having a printer driver.

10. The system of claim 1, wherein the rasterizer is implemented on a host device having a printer driver configured to drive the printer engine on a printer device using the output ink data.

11. The system of claim 1, wherein the texture information of the input image comprises a texture image and wherein the value of each pixel indicates texture height or texture ink layer number.

12. The system of claim 1, wherein the texture information of the input image comprises spot color texture information and wherein each value of a spot color index is set to indicate a varnish layer thickness, a presence of a background white ink, or a presence of a foreground white ink.

13. The system of claim 1, wherein the texture information of the input image comprises texture printing job command in printer job language (PJL) defined by a printer driver.

14. The system of claim 1, wherein the color converter comprises a plurality of hardware converters configured to process different colors in the color data in parallel.

15. The system of claim 1, wherein the output ink data comprises a plurality of color channels and at least one texture channel selected from a foreground white layer number channel, a background white layer number channel, and a varnish layer number channel.

16. The system of claim 15, wherein the value of the at least one texture channel indicates the thickness of a corresponding texture layer.

17. The system of claim 1, wherein the rasterizer is further configured to generate color attribute plane data from the input image, and wherein the halftoner is configured to convert the color data to the color halftone data based on the color attribute plane data.

18. A method for supporting texture printing comprising:
converting, with a rasterizer, an input image with texture information to color data and texture attribute plane data, wherein a first bit for defining each pixel in the texture attribute plane data comprises a change bit and the rasterizer is further configured to:
  compare texture information associated with a pixel (pixel n) with texture information associated with the previous pixel (pixel n−1) to determine whether the texture information of pixel n and pixel n−1 are the same, wherein the texture information associated with each pixel specifies a physical thickness of texture ink to be printed at the pixel; and
  set the change bit of pixel n to zero when the texture information associated with pixel n is the same as pixel n−1;
compressing, with a data compressor, the color data and the texture attribute plane data into compressed image data;
storing, on a memory device, the compressed image data prior to printing;
decompressing, with a data decompressor, the compressed image data to retrieve the color data and the texture attribute plane data;
converting, with a color converter and a halftoner, the color data to color halftone data; and
combining, with a texture data generator, the texture attribute plane data decompressed by the data decompressor and the color halftone data from the halftoner to generate output ink data for a printer engine to print the input image with texture.

19. The method of claim 18, wherein bits defining each pixel in the texture attribute plane data comprise the change bit, a white foreground bit, a white background bit, a varnish bit, and a plurality of texture layer number bits.

20. A method for supporting texture printing comprising:
receiving an input image with texture information;
generating texture attribute plane data based on the texture information of the input image, wherein bits defining each pixel in the texture attribute plane data comprise a first bit corresponding to a change bit, at least one bit specifying a texture type, and at least one bit specifying a texture thickness;
comparing texture information associated with a pixel (pixel n) with texture information associated with the previous pixel (pixel n−1) to determine whether the texture information of pixel n and pixel n−1 are the same, wherein the texture information associated with each pixel specifies a physical thickness of texture ink to be printed at the pixel; and
setting the change bit of pixel n to zero when the texture information associated with pixel n is the same as pixel n−1 and setting the change bit of pixel n to one when the texture information associated with pixel n is different from pixel n−1 to generate texture attribute plane data for the input image;
generating color data for the input image; and
storing the texture attribute plane data and the color data for printing.

* * * * *